United States Patent
Ndu et al.

(10) Patent No.: US 10,726,132 B2
(45) Date of Patent: Jul. 28, 2020

(54) ENCLAVE LAUNCH AND AUTHENTICATION

(71) Applicant: HEWLETT PACKARD ENTERPRISE DEVELOPMENT LP, Houston, TX (US)

(72) Inventors: Geoffrey Ndu, Bristol (GB); Ludovic Emmanuel Paul Noel Jacquin, Bristol (GB); Nigel Edwards, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 334 days.

(21) Appl. No.: 15/915,381

(22) Filed: Mar. 8, 2018

(65) Prior Publication Data

US 2019/0278913 A1 Sep. 12, 2019

(51) Int. Cl.
  *G06F 21/00* (2013.01)
  *G06F 21/57* (2013.01)
  (Continued)

(52) U.S. Cl.
  CPC ............ *G06F 21/575* (2013.01); *G06F 21/44* (2013.01); *G06F 21/51* (2013.01); *H04L 9/0841* (2013.01); *H04L 9/3213* (2013.01)

(58) Field of Classification Search
  CPC ..................................................... G06F 21/575
  (Continued)

(56) References Cited

U.S. PATENT DOCUMENTS 9,356,965 B2  5/2016 Kjeldaas
10,333,903 B1 * 6/2019 Campagna ............ H04L 63/061
(Continued)

FOREIGN PATENT DOCUMENTS

WO   2016/054303 A1  4/2016
WO   WO-2017082966 A1  5/2017
WO   2018/005850 A1  1/2018

OTHER PUBLICATIONS

Swami, Yogesh. "Intel SGX Remote Attestation is not sufficient." Proc. Black Hat USA. 2017.*
(Continued)

*Primary Examiner* — Harris C Wang
(74) *Attorney, Agent, or Firm* — Hewlett Packard Enterprise Patent Department

(57) ABSTRACT

A method comprising: launching, by a pre-boot environment, a pre-boot launch enclave (LE); creating, by the pre-boot LE, a launch token for a pre-boot quoting enclave (QE); authenticating, by the pre-boot LE, the launch token; launching, by the pre-boot environment with the launch token in response to the authentication, the pre-boot QE; generating, by the pre-boot QE, a public provisioning key, a private provisioning key, and an attestation key; verifying, by the pre-boot QE with a public key, authenticity of a device; securing, by the pre-boot QE with the public provisioning key, private provisioning key, and the public key, a communication channel with the device; encrypting, by the pre-boot QE with a system specific seal key, the public provisioning key, the private provisioning key, and the attestation key; and storing, by the pre-boot QE, the encrypted public provisioning key, the encrypted private provisioning key, and the encrypted attestation key in the device.

20 Claims, 4 Drawing Sheets

(51) Int. Cl.
*G06F 21/44* (2013.01)
*H04L 9/08* (2006.01)
*H04L 9/32* (2006.01)
*G06F 21/51* (2013.01)

(58) Field of Classification Search
USPC .......................................................... 726/27
See application file for complete search history.

(56) References Cited

U.S. PATENT DOCUMENTS

| | | | |
|---|---|---|---|
| 2008/0060068 A1* | 3/2008 | Mabayoje | G06F 21/31 726/9 |
| 2012/0159184 A1* | 6/2012 | Johnson | G06F 21/6218 713/189 |
| 2012/0163589 A1* | 6/2012 | Johnson | G06F 21/10 380/30 |
| 2012/0179904 A1* | 7/2012 | Dunn | G06F 21/575 713/155 |
| 2014/0025939 A1* | 1/2014 | Smith | G06F 9/24 713/2 |
| 2015/0178504 A1* | 6/2015 | Nystrom | G06F 9/45533 713/2 |
| 2016/0105280 A1 | 4/2016 | Kinshumann et al. | |
| 2016/0134419 A1* | 5/2016 | Smith | H04L 9/0844 380/30 |
| 2017/0083724 A1* | 3/2017 | Chhabra | G06F 21/72 |
| 2017/0171194 A1 | 6/2017 | Durham et al. | |
| 2017/0177449 A1 | 6/2017 | Bronk | |
| 2017/0372076 A1* | 12/2017 | Poornachandran | G06F 21/575 |
| 2019/0149341 A1* | 5/2019 | Robison | H04L 9/0891 713/156 |
| 2019/0243963 A1* | 8/2019 | Soriente | G06F 21/606 |
| 2019/0278913 A1* | 9/2019 | Ndu | G06F 21/51 |

OTHER PUBLICATIONS

Weiser, S. et al., "SGXIO: Generic Trusted I/o Path for Intel SGX," (Research Paper), Mar. 22-24, 2017, https://arxiv.org/pdf/1701.01061.pdf.

"Intel 64 and IA-32 Architectures Software Developer's Manual 325462-060US", Sep. 2016, 482 pages.

Aumasson et al, "SGX Secure Enclaves in Practice—Security and Crypto Review", Black Hat (2016), 10 pages.

Costan et al, "Intel SGX Explained", IACR Cryptology ePrint Archive 2016, 118 pages.

European Search Report and Written Opinion received for EP Patent Application No. 19161400.7, dated Aug. 16, 2019, 9 pages.

Intel, "Software Guard Extensions SDX for Linux", OS Developer Reference, retrived on Oct. 4, 2019, 320 pages.

Johnson, Simon, et al. "Intel software guard extensions: EPID provisioning and attestation services." ser. Intel Corporation (2016), 10 pages.

* cited by examiner

ENCLAVE LAUNCH AND AUTHENTICATION

BACKGROUND

Methods to verify the genuineness of an enclave rely on remotely provisioned enclaves. Such methods may utilize an internet connection. However, some systems may not be able to connect to the internet for security reasons.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

Figure 1:
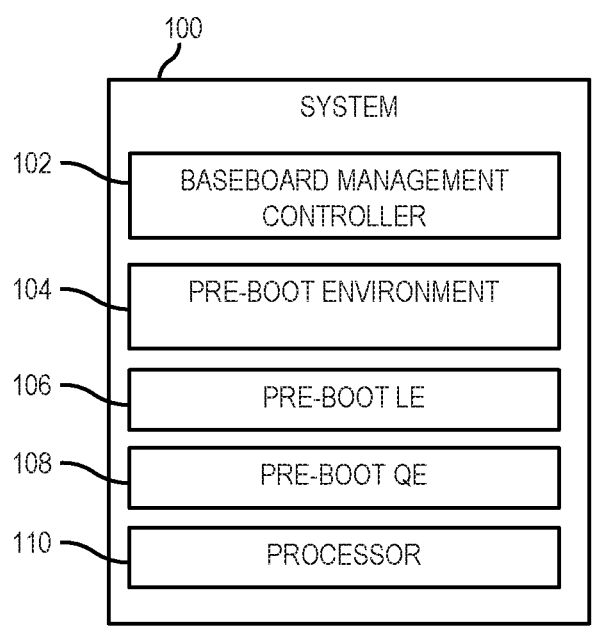
FIG. 1 is a block diagram of a system including a baseboard management controller, a pre-boot environment, a pre-boot launch enclave, and a pre-boot quoting enclave.

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Methods to verify the genuineness of an enclave rely on remotely provisioned enclaves. Remotely provisioned enclaves may be available from a third party. In such examples, methods may utilize an internet connection to connect a system including the enclave with the remotely provisioned enclave. However, some systems may not be able to connect to the internet for security reasons. For example an "air-gapped" system may not connect to the internet, not connect to any system connected to the internet, may not directly connect to the internet, and/or may utilize a firewall.

As used herein, an "enclave" may be at least a private region in memory that is protected from other processes or programs running or operating in memory. In other words an enclave may offer a space with confidentiality and integrity. Specific system software (i.e., machine readable instructions) may provision or launch enclaves. Other processes, software, programs, operating systems (OSs), hypervisors, or machine-readable instructions may not access or alter machine-readable instructions running in the enclave, regardless of privilege level. In another example, an enclave is a container or protected container. Machine-readable instructions, such as Intel Software Guard Extensions (SGX) included in the Intel Architecture, may be used to create the private or protected regions in memory (e.g., enclave).

As used herein, a "launch enclave" may be at least a special enclave to provide services to other enclaves. The launch enclave (LE) may create and authenticate launch tokens. The LE may access a launch token key, which other enclaves may not have access to. The LE may use the launch token key to create and authenticate the launch tokens. While other enclaves may launch with a launch token, an environment may not launch the LE with a launch token (in other words, the LE may be launched without a launch token). The LE may also be referred to as a provisioning enclave or architecture enclave.

As used herein, a "quoting enclave" may be at least an enclave to perform attestation of other enclaves. A quoting enclave (QE) may receive attestation requests or reports from other enclaves, such as an application enclave (AE). The QE may verify that the request or report is from a genuine source, as well as genuine enclave. The QE may then convert the request or report to an attestation report or quote and return the attestation report or quote to the requesting enclave. A QE may also generate keys to be utilized in the reports noted above, as well as to start or bootstrap secure communication channels with other devices.

Examples described herein may include a system with a pre-boot environment and a post-boot environment. At manufacturing or at a later time by a user, the pre-boot environment may launch a pre-boot LE. The pre-boot launch enclave may create launch tokens. The pre-boot LE may authenticate launch tokens. The pre-boot LE may use a launch token key to sign the launch tokens. A processor of the system may then verify that the launch token was authenticated with the correct key. The pre-boot environment may utilize the authenticated launch tokens to launch or provision pre-boot QEs. The pre-boot QEs may generate cryptographic keys, such as a public provisioning key, a private provisioning key, a public attestation key, and/or a private attestation key. The functionality described above may ensure system security may be maintained, while allowing the system to attest to AEs launched on the system. The post-boot QE may gather the attestation keys from a device that the pre-boot QE may store the keys on. The pre-boot QE may encrypt the keys before storing the keys on the device. The attestation keys may be utilized, by a post-boot QE, to create quotes for AEs. In other words, an AE executing on the system may receive an attestation request. The AE may request a quote from the post-boot QE. Utilizing the attestation keys, the post-boot QE may create a quote for or attest to the authenticity of the AE.

Accordingly, various examples provided herein use a pre-boot environment to launch a pre-boot launch enclave (LE). The pre-boot LE may create a launch token for a pre-boot quoting enclave (QE). The pre-boot LE may authenticate the launch token. The pre-boot environment, with the authenticated launch token, may launch the pre-boot QE. The pre-boot QE may generate a public provisioning key, a private provisioning key, and an attestation key. The pre-boot QE, with the public key, may verify the authenticity of a device. The pre-boot QE, with the public provisioning key, private provisioning key, and the public key, may secure a communication channel with the device. The pre-boot QE, with a system specific seal key, may encrypt the public provisioning key, the private provisioning key, and the attestation key. The pre-boot QE may store the encrypted public provisioning key, the encrypted private provisioning key, and the encrypted attestation key in the device.

As shown in FIG. 1, a system 100 includes a baseboard management controller (BMC) 102, a pre-boot environment 104, a pre-boot LE 106, a pre-boot QE 108, and a processor 110. The pre-boot environment 104 may launch the pre-boot LE 106 and the pre-boot QE 108. As noted by the name, the pre-boot LE 106 and pre-boot QE 108 may operate in the pre-boot environment 104. The pre-boot LE 106 may create and authenticate launch tokens. The launch tokens may be utilized to launch or provision other enclaves, such as the pre-boot QE 108. The pre-boot QE 108 may generate cryptographic keys, such as a public provisioning key, a private provisioning key, and an attestation key. The pre-boot QE may use the public provisioning key and private provisioning key to secure communication channels with other devices, such as the BMC 102. Another QE may utilize the cryptographic keys as well, if the other QE has access to them. For example, a QE launched in a post-boot environment may utilize the cryptographic keys to secure communication channels with devices, such as the BMC 102. One way to get the keys to other QEs in a post-boot environment is to store the keys in an accessible location. In an example, the pre-boot QE 108 may encrypt, with a system specific seal key, the public provisioning key, the private provisioning key, and the attestation key. The pre-boot QE 108 may then store, either in response to the encryption or upon a prompt from a user, the encrypted public provisioning key, the encrypted private provisioning key, and the encrypted attestation key in a device, for example, the BMC 102.

As used herein, a "computing device" may be a storage array, storage device, storage enclosure, server, desktop or laptop computer, computer cluster, node, partition, virtual machine, or any other device or equipment including a controller, a processing resource, or the like. In examples described herein, a "processing resource" may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution instructions stored on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Any machine-readable storage medium described herein may be non-transitory.

As used herein, a "device" may be any microcontroller, BMC, circuit, CPU, microprocessor, GPU, FPGA, chassis manager, rack level manager, server, trusted platform module (TPM), other electronic circuitry suitable to secure communications with an enclave and store encrypted keys, or a combination thereof. For example, the device may be a BMC of a server. In another example, the device may be a TPM. In such examples, the device may store data, such as the encrypted keys from an enclave. In other examples, the device may assist in starting or bootstrapping a secure communications channel with an enclave.

As used herein, a "Baseboard Management Controller" is a specialized service processor that monitors the physical state of a server or other hardware using sensors and communicates with a management system through an independent "out-of-band" connection. The BMC may also communicate with applications executing at the OS level through an input/output controller (IOCTL) interface driver, a Representational state transfer (REST) application program interface (API), or some other system software proxy that facilitates communication between the BMC and applications. The BMC may have hardware level access to hardware devices located in a server chassis. The BMC may be able to directly modify the hardware devices. The BMC may operate independently of the OS of the system that the BMC is located in. The BMC may be located on the motherboard or main circuit board of the server or other device to be monitored. The fact that a BMC is mounted on a motherboard of the managed server or otherwise connected or attached to the managed server does not prevent the BMC from being considered "separate". As used herein, a BMC has management capabilities for sub-systems of a computing device, and is separate from a processing resource that executes an OS of a computing device. The BMC is separate from a processor, such as a central processing unit, executing a high level OS or hypervisor on a system.

As used herein, a "pre-boot environment" is machine-readable instructions that may be stored in a machine-readable storage medium and executed by a processing resource. The pre-boot environment may be an operating environment accessible before an operating system is loaded. The pre-boot environment may offer limited functionality. The pre-boot environment may include a user interface. The pre-boot environment may allow a user to launch or provision enclaves. A pre-boot environment may include a unified extensible firmware interface (UEFI), basic input/output system (BIOS) interface, or other platform firmware environment.

As used herein, an "operating system" is machine-readable instructions that may be stored in a machine-readable storage medium and executed by a processing resource. An OS may include system software that manages computer hardware and software resources, as well as providing common services for computer programs. The OS may facilitate communications between a computing devices hardware and applications. The OS may include a user interface that allows a user to interact with the computing device. The OS may include layers, such as an application layer and a kernel layer. High level applications (as in, applications that a user may interact with) may execute at the application layer of an OS, while the kernel layer may include machine-readable instructions that control the computing devices hardware. During the setup or initialization of a computing device, an OS may be installed. During a computing devices boot or start-up process, the OS may load into a machine-readable storage medium. As noted above, a processor or processing resource of the computing device may execute the OS from the machine-readable storage medium. An OS may be another term for "post-boot environment". For example, after the OS is loaded into the machine-readable storage medium, computing device may be in a post-boot environment state. In other words, once a user is able to interact with an OS, the computing device may be considered to be in a post-boot environment.

As used herein, a "cryptographic hash function" may be a function comprising machine-readable instructions. The cryptographic hash function may include machine-readable instructions that, when executed by a processor, may receive an input. The cryptographic hash function may then generate a hexadecimal string to match the input. For example, the input may include a string of data (for example, the data structure in memory denoted by a starting memory address and an ending memory address). In such an example, based on the string of data the cryptographic hash function outputs a string, such as a hexadecimal string (as in, a series of multiple hexadecimal values). Further, any minute change to the input may alter the output string. In another example, the cryptographic hash function may be a secure hash function (SHA), any federal information processing standards (FIPS) approved hash function, any national institute of standards and technology (NIST) approved hash function, or any other cryptographic hash function.

As used herein, a "trusted platform module" or "TPM" may be an integrated circuit built into a motherboard of a computing device. The TPM may be tamper resistant or tamper proof. The TPM may be utilized for services on the computing device. The services may include device identification, authentication, encryption, measurement, determine device integrity, secure generation of cryptographic keys, remote attestation, and sealed storage. The TPM may include platform configuration registers (PCRs). The PCRs may store security relevant metrics.

As used herein, "privilege level" may be an operating level of machine-readable instructions. Privilege level may be the level of permissions that a user or machine-readable instructions of the computing device may have. Privilege level implementation may vary between different OS's. Different OS's may have numerous levels of permissions. For example, one user or set of machine-readable instructions may have a full administrator privilege level (as in a level with full access to the computing device), while others may have a limited privilege level.

As used herein, the "system specific seal key" may be a key unique to a system. An enclave may include data structures that define the enclave. The data structures may include system specific information. This information may allow enclaves tied to the system to obtain the seal key. In other words, enclaves with the systems unique data may access the seal key. For example, in response to a request for the seal key from an enclave, a processor or some other hardware of the system may verify the enclave. Further, in response to the verification of the enclave, the processor or other hardware may send the system specific seal key to an agreed upon memory location.

Figure 2:
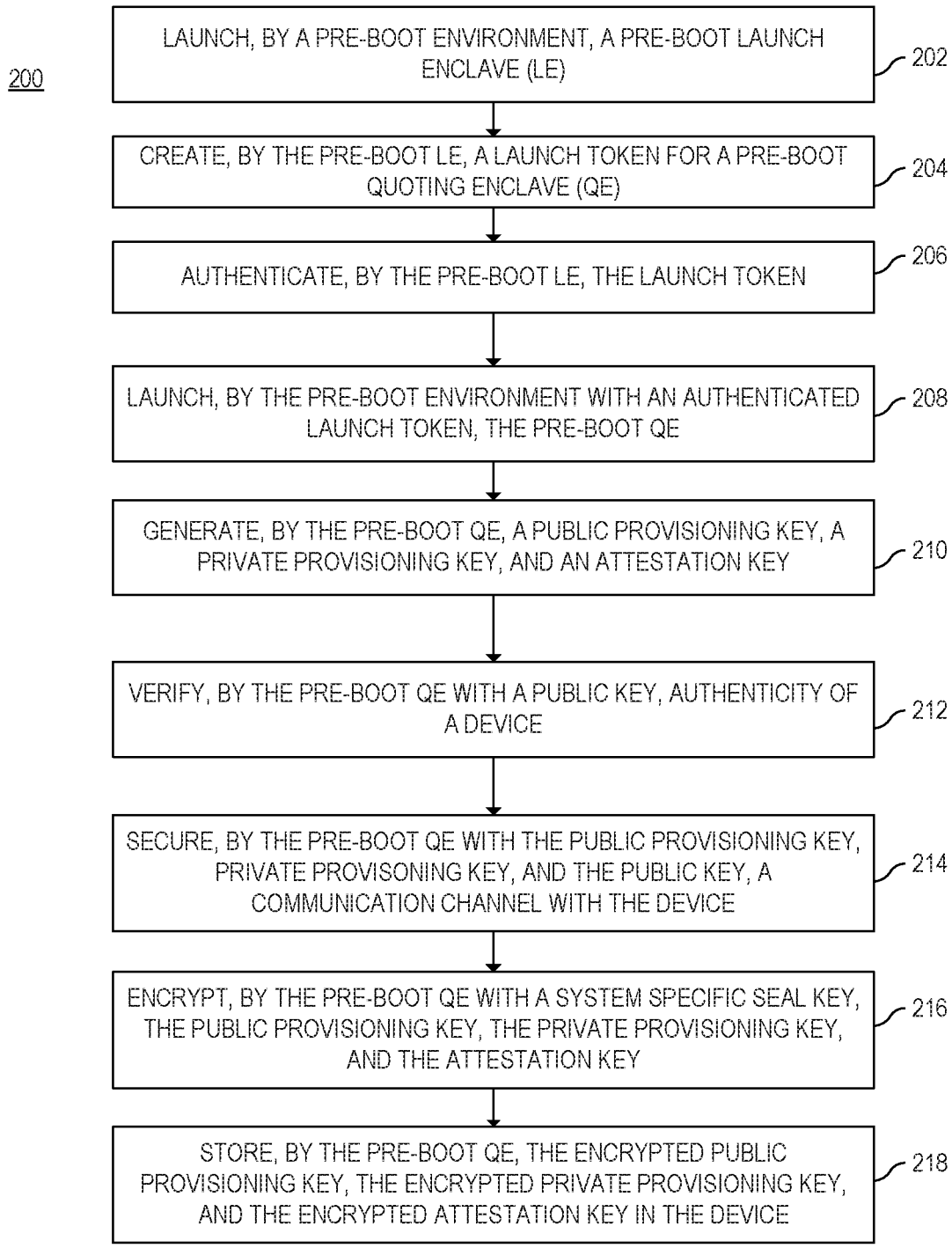
FIG. 2 is a flowchart of a method to launch a pre-boot launch enclave, launch a pre-boot quoting enclave, and store encrypted keys in a device.

FIG. 2 is a flowchart of a method to launch a pre-boot launch enclave, launch a pre-boot quoting enclave, and store encrypted keys in a device. Although execution of method 200 is described below with reference to the system 100 of FIG. 1, other suitable systems or modules may be utilized, including, but not limited to, computing device 400. Additionally, implementation of method 200 is not limited to such examples.

At block 202, a pre-boot environment 104 may launch a pre-boot LE 106. In another example, system software operating in the pre-boot environment 104 may launch the pre-boot LE 106. In another example, the system software and/or pre-boot environment 104 may be a BIOS interface, a UEFI, or other platform firmware environment. In another example, the pre-boot environment 104 may launch the pre-boot LE 106 in response to a user prompt. For example, the pre-boot environment 104 may include a user interface with various options. One of the options may include an option to launch pre-boot enclaves, such as a pre-boot LE 106. In such examples, a user may select the option to launch the pre-boot LE 106.

In another example, a processor 110 of the system 100 may verify the genuineness or authenticity of the launched pre-boot LE 106. As noted, an enclave may include a data structure. For example, the pre-boot LE 106 may include a data structure. One field of the data structure may include a signature from a private key of a private/public key pair. The processor 110 of the system 100 may include a hash value of the public key of the private/public key pair. In such examples, the processor 110 may use the hash of the public key of the private/public key pair to verify the signature from the private key of the private/public key pair. In the case that the signature is verified, the pre-boot LE 106 may be considered authentic or genuine (in other words, verified)

At block 204, the pre-boot LE 106 may create a launch token for a pre-boot QE 108. In an example, the launch token may be a data structure. In a further example, the data structure may contain information to launch an enclave. In an example, the launch token may contain a keyed cryptographic checksum (for example, a cipher based message authentication code (CMAC)) from the pre-boot LE 106 that are system 100 specific. In other words, the launch token may contain information that is specific to system 100. Further, the information may allow for a system 100 to launch enclaves without a remote server.

At block 206, the pre-boot LE 106 may authenticate the launch token. Stated another way, the pre-boot LE 106 may sign the launch token with a launch token key. In another example, a control register or memory location of the system 100 may contain the launch token key. In an example, the memory location may be an agreed upon memory location determined by the processor 110 and/or the pre-boot LE 106. In a further example, the pre-boot LE 106 may use a CMAC with the launch token key to sign the launch token. In another example, the launch token may include a prompt or information to set an attribute in the pre-boot QE 108 that may allow the pre-boot QE 108 to access system specific seal keys. In another example, the pre-boot LE 106 may automatically authenticate the launch token as it is generated. In another example, the pre-boot environment 104 may automatically or with user input authenticate the launch token. In another example, the pre-boot environment 104 may verify the launch token generated and authenticated by the pre-boot LE 106. In response to the verification of the launch token by the pre-boot environment 104, the pre-boot environment 104 may sign or authenticate with a CMAC the launch token.

At block 208, the pre-boot environment 104 may launch the pre-boot QE 108, in response to the authentication of the launch token. In an example, when the launch token is authenticated, the pre-boot environment 104 may automatically launch the pre-boot QE 108 with the launch token. In another example, after the launch token is authenticated, user input may prompt the pre-boot environment 104 to launch the pre-boot QE 108.

At block 210, the pre-boot QE 108 may generate a public provisioning key, a private provisioning key, and an attestation key. In another example, the pre-boot QE 108 may generate a public attestation key and a private attestation key. Further, the attestation keys may be utilized to remotely attest AEs launched on the system 100.

As noted above, the pre-boot QE 108 may generate keys. Keys may include a public provisioning key and a private provisioning key. The public provisioning key may be considered the identity of a QE. In other words, the public provisioning key may be the shared information from the QE to a device (for example, a BMC 102). In such examples, the QE can use the public provisioning key, the private provisioning key, and the public key of the device to start or bootstrap secure communications with a device that has been verified to be authentic. The private provisioning key may be the private or secret information that the QE uses to calculate a shared secret or shared key. For example, the QE may use the public provisioning key and private provisioning key to initiate a key exchange with the device (e.g., a BMC 102).

The pre-boot QE 108 may also generate attestation keys. In another example, the pre-boot QE 108 may generate private attestation keys and public attestation keys. A QE may use the private attestation key to sign attestation quotes or reports. Other applications or devices can verify that the signature in the attestation report or quote is authentic with the public attestation key. In such examples, the pre-boot QE 108 may store the public attestation key in the device or some other location that is readily available. When a QE signs an attestation quote or report and sends the quote or report to a third party, the third party may ensure that the quote or report is authentic by checking signature with the public attestation key.

At block 212, the pre-boot QE 108 may verify the authenticity of a device (e.g., a BMC 102) with the public key of the device hardcoded into the pre-boot QE. In another example, the pre-boot QE 108 may use a digital certificate supplied by the device to verify authenticity of the device (e.g., the BMC 102).

At block 214, the pre-boot QE 108, with the public provisioning key and private provisioning key, may secure a communication channel with the device (e.g., the BMC 102). In such examples, the pre-boot QE 108 may initiate a key exchange (e.g., a Diffie-Hellman key exchange) with the device (e.g., the BMC 102) to start or bootstrap a secure communication channel.

In an example of a key exchange, a QE (e.g., the pre-boot QE 108 or post-boot QE) may share the public provisioning key with the device and the device may share the public key with the QE. For example, x and y. The QE may use the private provisioning key to perform a calculation and send the result to the device. The device may do the same, except utilizing some value known to the device. For example, the QE may calculate and send $A=x^a$ mod y, while the device may calculate and send $B=X^b$ mod y. The QE may then perform a calculation with the result of the device and the private provisioning key, which may equal the calculation performed by the device with the result from the QE and the key known to the device. The left side of the equation below may be the calculation performed by the QE, while the right side may be the calculation performed by the device:

$$B^a \bmod y = A^b \bmod y$$

The results may be considered a shared secret key to be used in encrypting/decrypting communications between the QE and device.

At block 216, the pre-boot QE 108, with a system specific seal key, may encrypt the public provisioning key, the private provisioning key, and the attestation key. In another example, the pre-boot QE 108 may also encrypt a private attestation key and a public attestation key. In an example, the system specific seal key may be associated with any enclaves provisioned on the system 100. In another example, the pre-boot LE 106 may request the system specific seal key from the system 100 or the processor 110 of the system 100. In response to the request for the system specific seal key, the processor 110 of the system may send the system specific seal key to an address specified by the pre-boot LE 106. In a further example, the pre-boot QE 108 may gather the system specific seal key from the specified address. In another example, the processor 110 of the system 100 may verify that the enclave requesting the system specific seal key is an LE. In the case that the requesting enclave is not an LE, then the processor 110 may not send the system specific seal key to the specified address. In another example, the pre-boot QE 108 may be signed by the private key of private/public key pair, similar to the pre-boot LE 106. Further, the pre-boot QE 106 may request the system specific seal key from the system 100. In such examples and as noted above, the system 100 or the processor 110 of the system 100 may include a hash value of the public key of the private/public key pair. In such examples, the processor 110 may use the hash of the public key of the private/public key pair to verify the signature from the private key of the private/public key pair. In the case that the signature is verified, the pre-boot QE 108 may be considered authentic or genuine (in other words, verified) and may access the system specific seal key.

At block 218, the pre-boot QE 108 may store the encrypted public provisioning keys, the encrypted private provisioning keys, and the encrypted attestation keys in the device (e.g., the BMC 102). In response to the establishment of a secure communication channel, the pre-boot QE 108 may proceed to store the encrypted public provisioning keys, the encrypted private provisioning keys, and the encrypted attestation keys noted above in the device (e.g., the BMC 102). In another example, the pre-boot QE 108 may also store the encrypted public attestation key and encrypted private attestation keys in the device (e.g., the BMC 102).

In an example, the device may be a BMC 102. In another example the device may be a trusted platform module (TPM). In another example, the device may be some combination of the components noted above, some other component, or microcontroller.

Figure 3:
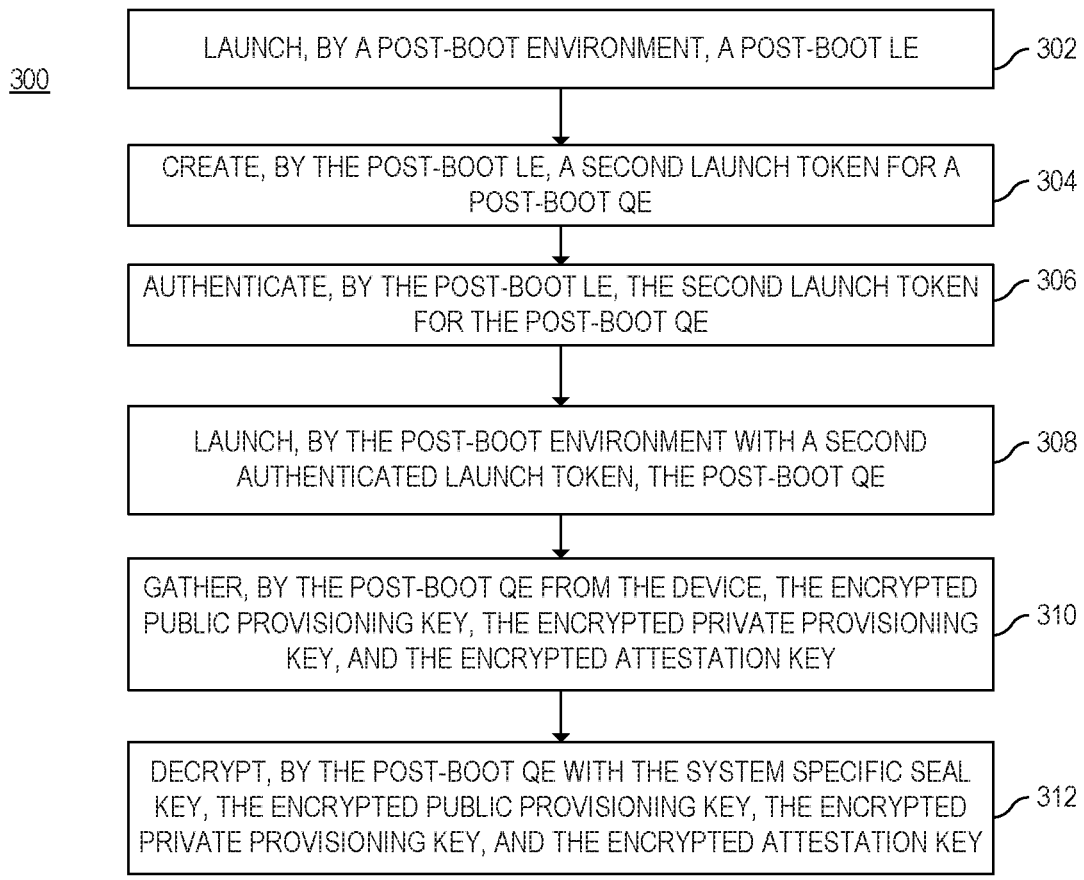
FIG. 3 is a flowchart of a method to launch a post-boot launch enclave, launch a post-boot quoting enclave, and decrypt the stored encrypted keys from the device.

FIG. 3 is a flowchart of a method to launch a post-boot launch enclave, launch a post-boot quoting enclave, and decrypt the stored encrypted keys from the device. Although execution of method 300 is described below without reference to a specific system, suitable systems or modules may be utilized. Systems, such as system 100 or computing device 400 may be utilized to execute method 300. While system 100, noted above, describes a system with a pre-boot environment 104, after the systems 100 OS is loaded, the system 100 may be considered to be in a post-boot environment (as in, including a post-boot environment).

At block 302, a post-boot environment may launch a post-boot LE. As noted, the post-boot environment may include an OS. In another example, the post-boot environment may include machine-readable instructions to launch enclaves. In a further example, the machine-readable instructions may include an instruction to launch a post-boot enclave. In an example, a user may prompt the post-boot environment to launch the post-boot LE. In another example, the post-boot environment may automatically launch the post-boot LE, in response to system 100 entering a post-boot environment state.

At block 304, the post-boot LE may create a second launch token (in other words, different than the first launch token) for a post-boot QE. In an example, the second launch token may be a data structure. In a further example, the data structure may contain information to launch an enclave. In an example, the launch token may contain information that is specific to system 100. Further, the information may allow for a system 100 to verify the genuineness of LEs without a remote server At block 306, the post-boot LE may authenticate the second launch token for the post-boot QE. Similar to the process described above for the pre-boot LE 106, the post-boot LE 106 may include machine-readable instructions to authenticate the second launch token using a control register or memory location in the system. In another example, a control register or memory location of the system 100 may contain the launch token key. In an example, the memory location may be an agreed upon memory location determined by the processor 110 and the post-boot LE. In a further example, the post-boot LE may use a CMAC with the launch token key to sign the launch token. In another example, the launch token may include a prompt or information to set an attribute in the post-boot QE that may allow the post-boot QE to access system specific seal keys. In another example, the post-boot LE may automatically authenticate the launch token as it is generated. In another example, the post-boot environment may automatically or with user input user input may prompt the post-boot environment to authenticate the launch token. In another example, the post-boot environment may verify the launch token generated and authenticated by the post-boot LE. In response to the verification of the launch token by the post-boot environment, the post-boot environment may authenticate with a CMAC or sign the launch token.

In another example, a processor 110 of the system 100 may verify the genuineness or authenticity of the launched post-boot LE. As noted, an enclave may include a data structure. For example, the post-boot LE may include a data structure. One field of the data structure may include a signature from a private key of a private/public key pair. The processor 110 of the system 100 may include a hash value of the public key of the private/public key pair. In such examples, the processor 110 may use the hash of the public key of the private/public key pair to verify the signature from the private key of the private/public key pair. For example, the processor 110 may compare the hash value of the public key of the private/public key pair, which may be stored in the processor, to a hash value of the public key of the private/public key pair stored in the data structure of the post-boot LE. The processor 110 may then use the public key of the private/public key to verify the signature of the post-boot LE. In the case that the signature is verified, the post-boot LE may be considered authentic or genuine (in other words, verified).

At block 308, the post-boot environment may, with the second launch token, launch the post-boot QE. In response to the authentication of the second launch token. In an example, when the second launch token is authenticated, the post-boot environment may automatically launch the post-boot QE with the second launch token. In another example, after the second launch token is authenticated, user input may prompt the post-boot environment to launch the post-boot QE.

At block 310, the post-boot QE may gather the encrypted keys from the device. In response to the launch of the post-boot QE, the post-boot QE may gather the encrypted public provisioning key, the encrypted private provisioning key, and the encrypted attestation key. In another example, the post-boot QE may gather an encrypted private attestation key and an encrypted public attestation key.

In another example, the post-boot QE, with the public key noted above, may verify the authenticity of the device, prior to gathering the encrypted public provisioning key, the encrypted private provisioning key, and the encrypted attestation key (or encrypted private attestation key and an encrypted public attestation key). In an example, the device may offer the public key to any other component or program (such as the post-boot QE) seeking to authenticate the device. In another example, the post-boot QE may verify the authenticity of the post-boot QE with an embedded digital certificate.

At block 312, the post-boot QE, with the system specific seal key, may decrypt the keys. In an example, in response to gathering the encrypted public provisioning key, the encrypted private provisioning key, and the encrypted attestation key (or encrypted private attestation key and an encrypted public attestation key), the post-boot QE may also gather the system specific seal key. In a further example, the post-boot QE may be specific to the system. In other words, the post-boot QE was launched on and from the system. In such examples, the post-boot QE may be signed with the same private key of the private/public key pair as the pre-boot QE 106. The system 100 or the processor 110 of the system 100 may verify the post-boot QE, similar to the pre-boot QE 106 verification described above. For example, the system 100 or the processor 110 of the system 100 may include a hash value of the public key of the private/public key pair. In such examples, the processor 110 may use the hash of the public key of the private/public key pair to verify the signature from the private key of the private/public key pair. In the case that the signature is verified, the post-boot QE 108 may be considered authentic or genuine (in other words, verified) and may access the system specific seal key (from an agreed upon memory address or location). Once the post-boot QE has the system specific seal key, the post-boot QE may utilize the system specific seal key to decrypt the encrypted public provisioning key, the encrypted private provisioning key, and the encrypted attestation key (or encrypted private attestation key and an encrypted public attestation key).

In another example, the post-boot QE may secure a communication channel with the device. The post-boot QE may use the decrypted public provisioning key and private provisioning key to start or bootstrap the secure communication channel. In such examples, the post-boot QE may initiate a key exchange (e.g., a Diffie-Hellman key exchange) with the device, in the same manner as described above for the pre-boot QE 108. For example, the post-boot QE may share the decrypted public provisioning key with the device. The post-boot QE and the device may perform the same calculations as above, to arrive at a shared secret or shared key. In another example, the post-boot QE may establish a secure communication channel with other devices, remote systems, or any other system/component requesting attestation of AE's on the system 100.

In another example, the post-boot LE may launch AEs. A remote system may request that a QE attest the AEs authenticity. In such examples, the post-boot QE may supply a report or quote to the AE on the authenticity of the AE (the AE to provide the report to the remote system). The post-boot QE may utilize the decrypted attestation key (or decrypted private attestation key and a decrypted public attestation key) to create the report. In another example, the remote system may verify the attestation quote using the public attestation key.

As noted, FIG. 1 is a block diagram of a system 100 including a BMC 102, a pre-boot environment 104, a pre-boot LE 106, a pre-boot QE 108, and a processor 110. In an example, the BMC 102 may store keys (such as a public provisioning key, an encrypted private provisioning key, a public attestation key, and an encrypted private attestation key) from a pre-boot QE 108. The BMC 102 may also provide the keys (such as the public provisioning key, the encrypted private provisioning key, the public attestation key, and the encrypted private attestation key) in response to a request for the keys by a post-boot QE. In another example, the BMC 102 may provide a public key associated with the BMC 102. The public key associated with the BMC 102 may be utilized to verify the authenticity of the BMC 102.

As noted above, the system 100 may include a pre-boot environment 104. In an example, the pre-boot environment 104 may launch a pre-boot LE 106 and a pre-boot QE 108. In a further example, in response to authentication of a launch token from the pre-boot LE 106, the pre-boot environment 104 may launch the pre-boot QE 108. In another example, the functionality described above may occur automatically, upon input from a user, or execution of machine-readable instructions.

As noted above, the system 100 may include a pre-boot LE 106. The pre-boot LE 106 may create launch tokens for other enclaves. The pre-boot LE 106 may also authenticate or sign the launch tokens. For example, the pre-boot LE 106 may create a launch token for a pre-boot QE 108 and may authenticate the launch token automatically or by a user prompt after the creation of a launch token. In another example, the pre-boot LE 106 may create and authenticate launch tokens for other enclaves. For example, the other enclaves may include other pre-boot LEs or AEs. In another example, the pre-boot LE 106 may also obtain a system 100 specific seal key.

As noted above, the system 100 may include a pre-boot QE 108. In an example, the pre-boot QE 108 may generate a private provisioning key, a public provisioning key, a public attestation key, and a private attestation key. In another example, the pre-boot QE 108 may verify the authenticity of the BMC 102. In such examples, the pre-boot QE 108 may verify the authenticity of the BMC 102 with the public key noted above. In another example, the pre-boot QE 108 may verify the authenticity of the BMC 102 with an embedded digital certificate.

In an example, in response to the verification of the authenticity of the BMC 102, the pre-boot QE 108 may secure a communication channel with the BMC 102. The pre-boot QE 108 may secure the communication channel with a key exchange (e.g., a Diffie-Hellman exchange). For example, in a Diffie-Hellman exchange, the public provisioning key may be the starting or common value between the pre-boot QE 108 and the BMC 102, while the private provisioning key may be the value that the pre-boot QE 108 utilizes to calculate the shared secret (in such examples, the BMC 102 may include a some private value to calculate the shared secret). In another example, a different method of securing communication channels may be utilized. In another example, the pre-boot QE 108 may encrypt the private provisioning key and the private attestation key. In a further example, the pre-boot QE 108 may encrypt the private provisioning key and the private attestation key with the system 100 specific seal key from the pre-boot LE 106. In response to the communication channel being secured and the private provisioning key and private attestation key being encrypted, the pre-boot QE 108 may communicate and store the encrypted private provisioning key, the public provisioning key, the public attestation key, and the encrypted private attestation key on a machine-readable storage medium of the BMC 102.

In another example, the system 100 may include a post-boot environment. The post-boot environment may perform similar functionality as the pre-boot environment 104, in relation to the enclaves noted above. For example, the post-boot environment may launch a post-boot LE and a post-boot QE. In a further example, the post-boot environment may use authenticated launch tokens to launch the post-boot QE. In another example, the post-boot environment may launch AEs. The post-boot environment may launch the AE's with or without authenticated launch tokens.

In another example, the system 100 may include a post-boot LE. The post-boot LE may create and authenticate launch tokens for other enclaves. For example, the post-boot LE may create and authenticate a launch token for a post-boot QE. In another example, the post-boot LE may create and authenticate launch tokens for other enclaves. For example, the other enclaves may include other post-boot LEs, QEs, or AEs. In another example, the post-boot LE may also obtain the system 100 specific seal key.

In another example, the system 100 may include a post-boot QE. In an example, the post-boot QE may retrieve the encrypted private provisioning key, the public provisioning key, the public attestation key, and the encrypted private attestation key. In a further example, the post-boot QE may, in response to obtaining the system 100 specific seal key from the post-boot LE, decrypt the encrypted private provisioning key and the encrypted private attestation key. In another example, the post-boot QE may receive requests for quotes (or attestation quotes, reports, or attestation reports) from AEs. In other words, an AE may request a quote (or attestation report, reports, or attestation reports) from the post-boot QE. In response to the reception of the request for a quote or report, the post-boot QE may generate the quote or report. Once the quote or report is generated, the post-boot QE may send the quote or report to the AE. In a further example, the AE may send the quote or report to the remote system that originally requested the attestation.

Figure 4:
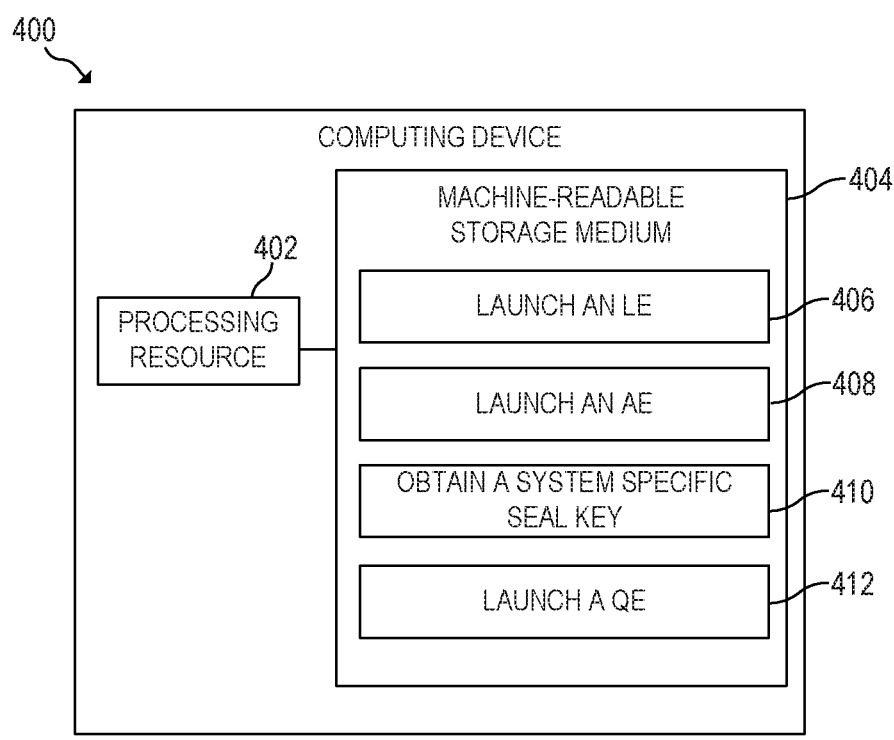
FIG. 4 is a block diagram of a computing device capable of launching a launch enclave, launching an application enclave, obtaining a system specific seal key, and launching a quoting enclave.

FIG. 4 is a block diagram of a computing device capable of launching a launch enclave, authenticating launch tokens, launching an application enclave, obtaining a system specific seal key, and launching a quoting enclave, according to one example. The computing device 400 may include a processing resource 402 and a machine-readable storage medium 404. The processing resource 402 may execute instructions included in the machine-readable storage medium 404. The instructions may include instructions 406 to launch an LE. In an example, the LE may create and authenticate launch tokens. In another example, the processing resource 402 may execute the instructions 406 to launch an LE in an offline or online mode (In other words, in a pre-boot or post-boot environment, respectively). In another example, the processing resource 402 may utilize the launch tokens to launch other enclaves. In an example, the processing resource 402 may utilize authenticated launch tokens to launch other enclaves.

The machine-readable storage medium 404 may include instructions 408 to launch an AE. In another example, the AE may be utilized for various purposes. The AE may communicate with a remote system. The communication may be secure or may include secure information. To ensure security is maintained, the remote system may request that the AE attest authenticity. In other words, the remote system may request an attestation quote from the AE. In an example, in response to the AE receiving an attestation request from a remote system, the AE may request the attestation quote. For example, the AE may request an attestation quote from the QE.

The machine-readable storage medium 404 may include instructions 410 to obtain a system specific seal key. In an example, the computing device 400 may store the system specific seal key in a control register of the processing resource 402. In a further example, enclaves launched on the computing device 400 may access or utilize the system specific seal key.

The machine-readable storage medium 404 may include instructions 412 to launch a QE. In response to the authentication of a launch token, the processing resource 402 may execute instructions 414 to launch the QE. In an example, the processing resource 402 may execute the instructions 414 to launch a QE in a pre-boot environment. In such examples, the QE may generate a public provisioning key, a private provisioning key, a public attestation key, and a private attestation key. In a further example, the QE may utilize the public provisioning key to establish a secure and encrypted communication channel with a BMC. Further, the QE may verify that the BMC is authentic. The QE, in an offline or pre-boot environment and in response to the QE launching offline, may encrypt the generated public provisioning key, the private provisioning key, the public attestation key, the private attestation key, or some combination thereof. Further, the QE may store the encrypted keys in a machine-readable storage medium of the BMC.

In another example, the processing resource 402 may execute instructions 412 to launch the QE in a post-boot environment. In such examples, the QE may obtain the public provisioning key, the private provisioning key, the public attestation key, and the private attestation key (some of which may be encrypted) from the BMC. In further example, the QE may decrypt the obtained keys, in the case that the keys are encrypted (or that some of the keys are encrypted). The QE may utilize the system specific seal key, which may be obtained by the QE from the computing device 400. In such examples, in response to a request for an attestation quote from an AE, the QE may create the attestation quote. The QE may then sign the attestation quote with the private attestation key. The QE may then send the signed attestation quote to the AE.

Although the flow diagram of FIGS. 2-3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. A method comprising:
launching, by a pre-boot environment, a pre-boot launch enclave (LE);
creating, by the pre-boot LE, a launch token for a pre-boot quoting enclave (QE);
authenticating, by the pre-boot LE, the launch token;
launching, by the pre-boot environment with the launch token in response to the authentication, the pre-boot QE;
generating, by the pre-boot QE, a public provisioning key, a private provisioning key, and an attestation key;
verifying, by the pre-boot QE with a public key, authenticity of a device;
securing, by the pre-boot QE with the public provisioning key, private provisioning key, and the public key, a communication channel with the device;
encrypting, by the pre-boot QE with a system specific seal key, the public provisioning key, the private provisioning key, and the attestation key; and
storing, by the pre-boot QE, the encrypted public provisioning key, the encrypted private provisioning key, and the encrypted attestation key in the device.

2. The method of claim 1, further comprising:
launching, by a post-boot environment, a post-boot LE;
creating, by the post-boot LE, a second launch token for a post-boot QE;
authenticating, by the post-boot LE, the second launch token for the post-boot QE;
launching, by the post-boot environment with the second launch token in response to authentication, a post-boot QE;
gathering, by the post-boot QE from the device, the encrypted public provisioning key, the encrypted private provisioning key, and the encrypted attestation key; and
decrypting, by the post-boot QE with the system specific seal key, the encrypted public provisioning key, the encrypted private provisioning key, and the encrypted attestation key.

3. The method of claim 2, further comprising:
verifying, by the post-boot QE with the public key, authenticity of the device; and
securing, by the post-boot QE with the decrypted public provisioning key, decrypted private provisioning key, and the public key, a different communication channel with the device.

4. The method of claim 2, further comprising:
launching, by the post-boot LE, an application enclave (AE); and
in response to a request to attest authenticity of the AE, attesting, by the post-booting QE with the decrypted attestation key, the authenticity of the application enclave with an attestation quote.

5. The method of claim 4, wherein the attestation key includes a public attestation key and a private attestation key.

6. The method of claim 5, further comprising:
storing, by the pre-boot QE, the public attestation key in the device.

7. The method of claim 6, further comprising:
verifying, by the device with the public attestation key, the attestation quote.

8. The method of claim 6, further comprising:
gathering, by a third party, the public attestation key from the device; and
verifying, by the third party with the public attestation key, the attestation quote.

9. The method of claim 1, wherein the device is a baseboard management controller.

10. The method of claim 1, wherein the device is a trusted platform module.

11. The method of claim 1, wherein the system specific seal key is associated with enclaves provisioned on a specific system.

12. The method of claim 1, wherein the public key is included in a digital certificate embedded in a system.

13. A system comprising:
a baseboard management controller (BMC);
a pre-boot environment to:
 launch a pre-boot launch enclave (LE) to create and authenticate a launch token;
 obtain a seal key associated with the system;
 launch, with the launch token authenticated by the pre-boot launch enclave, a pre-boot quoting enclave (QE), the pre-boot QE to:
  generate a private provisioning key and a public provisioning key;
  generate a public attestation key and a private attestation key;
  verify, with an embedded digital certificate, authenticity of the BMC;
  bootstrap secure communication to the BMC, with the public provisioning key, private provisioning key, and a public key;
  encrypt, with the seal key, the private provisioning key and the private attestation key; and
  store the public provisioning key, the encrypted private provisioning key, the public attestation key, and the encrypted private attestation key in the BMC.

14. The system of claim 13, further comprising:
a post-boot environment to:
 launch a post-boot LE to create and authenticate a second launch token;
 launch, with the second launch token authenticated by the post-boot launch enclave, a post-boot QE, the post-boot QE to:
  retrieve the encrypted private provisioning key and the encrypted private attestation key from the BMC;
  decrypt, with the seal key associated with the system, the encrypted private provisioning key and the encrypted private attestation key;
  in response to a request from an application enclave (AE) to attest the AE, create, with the private attestation key, an attestation quote; and
  send the attestation quote to the AE.

15. The system of claim 14, wherein the AE receives the request to attest the AE from a remote server.

16. The system of claim 13, wherein the seal key is available to any AE launched on the system.

17. The system of claim 13, wherein the communication to the BMC is secured with encryption and message authentication bootstrapped by a Diffie-Hellman key exchange.

18. The system of claim 13, wherein the pre-boot environment is a unified extensible firmware interface.

19. A non-transitory machine-readable storage medium encoded with instructions executable by a processor, the non-transitory machine-readable storage medium comprising, instructions to:
launch a launch enclave (LE) to create and authenticate launch tokens;
launch an application enclave (AE);
obtain a system specific seal key;
launch a quoting enclave (QE) with an authenticated launch token, wherein in response to the QE launching in an offline environment, the QE to:
 generate a public provisioning key, a private provisioning key, a public attestation key, and a private attestation key;
 establish, by a key exchange, a secure and encrypted communication channel to a baseboard management controller (BMC);
 verify BMC authenticity;
 encrypt, with the system specific seal key, the private provisioning key and private attestation key; and
 store the encrypted private provisioning key and encrypted private attestation key in the BMC.

20. The non-transitory machine-readable storage medium of claim 19, wherein, in response to the quoting enclave launching in an online environment, the quoting enclave to:
obtain the encrypted private provisioning key and encrypted private attestation key from the BMC;
decrypt the encrypted private provisioning key and encrypted private attestation key with the system specific seal key; and
in response to a request from the AE for an attestation quote:
 create the attestation quote with the private attestation key; and
 provide the attestation quote to the AE.

* * * * *